(12) United States Patent
Windsor et al.

(10) Patent No.: US 9,521,114 B2
(45) Date of Patent: *Dec. 13, 2016

(54) SECURING EMAIL COMMUNICATIONS

(71) Applicant: Fortinet, Inc., Sunnyvale, CA (US)

(72) Inventors: Carl M. Windsor, Wilmslow (GB); Jiandong Cheng, Ottawa (CA)

(73) Assignee: Fortinet, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/154,731

(22) Filed: May 13, 2016

(65) Prior Publication Data

US 2016/0255049 A1 Sep. 1, 2016

Related U.S. Application Data

(63) Continuation of application No. 14/745,410, filed on Jun. 20, 2015, which is a continuation of application No. 14/558,939, filed on Dec. 3, 2014, now Pat. No. 9,130,989, which is a continuation of application No. 13/886,841, filed on May 3, 2013, now Pat. No. 8,914,883.

(51) Int. Cl.
*H04L 29/06* (2006.01)
*G06F 17/30* (2006.01)
*H04L 12/58* (2006.01)
*H04L 29/08* (2006.01)

(52) U.S. Cl.
CPC ........ *H04L 63/02* (2013.01); *G06F 17/30876* (2013.01); *H04L 51/04* (2013.01); *H04L 51/12* (2013.01); *H04L 63/101* (2013.01); *H04L 63/1408* (2013.01); *H04L 63/1441* (2013.01); *H04L 63/1483* (2013.01); *H04L 67/2819* (2013.01)

(58) Field of Classification Search
CPC ........ H04L 51/12; H04L 63/02; H04L 63/101; H04L 63/1408; H04L 63/1441; H04L 63/1483; G06F 17/30876
See application file for complete search history.

(56) References Cited

U.S. PATENT DOCUMENTS

| | | | |
|---|---|---|---|
| 8,286,255 | B2 | 10/2012 | Grant et al. |
| 8,914,883 | B2 | 12/2014 | Windsor et al. |
| 9,130,989 | B2 | 9/2015 | Winsor et al. |
| 2005/0005164 | A1 | 1/2005 | Syiek et al. |

(Continued)

OTHER PUBLICATIONS

Gee et al., "Doppelganger Domains." Godal Group. Sep. 2011.
(Continued)

*Primary Examiner* — Minh Dinh
(74) *Attorney, Agent, or Firm* — Hamilton, DeSanctis & Cha LLP

(57) ABSTRACT

Methods and systems are provided for securing email communications. According to one embodiment, a network device receives an outbound email originated by a computing device of an internal network and directed to a target recipient. It is determined whether a domain name of the target recipient is present in a global doppelganger database. When the domain name is determined to be present in the global doppelganger database, transmission of the outbound email to the target recipient is prevented if the domain name is an unacceptable domain name and transmission of the the outbound email to the target recipient is permitted if the domain name is an acceptable domain name.

12 Claims, 9 Drawing Sheets

(56) References Cited

U.S. PATENT DOCUMENTS

2013/0333026 A1    12/2013   Starink et al.
2014/0331318 A1    11/2014   Windsor et al.
2015/0089627 A1     3/2015   Winsor et al.
2015/0312214 A1    10/2015   Winsor et al.

OTHER PUBLICATIONS

Notice of Allowance for U.S. Appl. No. 13/886,841 mailed Nov. 7, 2014.
Non-Final Rejection for U.S. Appl. No. 13/886,841 mailed Oct. 24, 2014.
Non-Final Rejection for U.S. Appl. No. 14/558,939 mailed Jun. 19, 2015.
Notice of Allowance for U.S. Appl. No. 14/558,939 mailed Jul. 29, 2015.
Non-Final Rejection for U.S. Appl. No. 14/745,410 mailed Mar. 10, 2016.

Doppelganger Database

| Domain Name | MX Configured? | Domain Owner | Time Since Registration | Sliding Scale Score | Status |
|---|---|---|---|---|---|
| usabc.com | Yes | ABC | 10 Years | 10 | Acceptable |
| usaabc.com | Yes | XYZ | 3 Months | 3.2 | Unacceptable |
| usbc.com | No | XYZ | 6 Months | 3.1 | Unacceptable |
| ○○○ | | | | | |
| usaabc.net | No | XYZ | 9 Months | 2.8 | Unacceptable |
| us.abc.com | Yes | ABC | 6 Years | 9.5 | Acceptable |

400 ⟶

Local Black List

| Domain Name | Mail Configured? | Domain Owner | Time Since Registration | Web Server Configured | Wildcard Characters Accepted |
|---|---|---|---|---|---|
| hoymail.com | Yes | XYZ | 1 Year | No | Yes |
| fortinett.com | Yes | XYZ2 | 3 Months | No | Yes |
| boradcom.com | No | XYZ | 6 Months | Yes | Yes |
| ⋮ | | | | | |
| quallcomm.com | No | XYZ2 | 9 Months | Yes | Yes |
| noveell.com | Yes | XYZ3 | 9 Months | No | VA |

Local White List

| Domain Name | Mail Configured? | Domain Owner | Time Since Registration | Web Server Configured | Wildcard Characters Accepted |
|---|---|---|---|---|---|
| hotmail.com | Yes | Hotmail | 10 Years | Yes | No |
| fortinet.com | Yes | Fortinet, Inc | 7 Years | Yes | No |
| sprint.com | Yes | Sprint, Inc | 8 Years | Yes | No |
| ⋮ | | | | | |
| Bestbuy.com | Yes | Bestbuy, Inc | 10 Years | Yes | No |
| novell.com | Yes | Novell, Inc | 9 Years | Yes | No |

FIG. 5

SECURING EMAIL COMMUNICATIONS

CROSS-REFERENCE TO RELATED APPLICATIONS

This application is a continuation of U.S. patent application Ser. No. 14/745,410, filed Jun. 20, 2015, now U.S. Pat. No. 9,413,716, which is a continuation of U.S. patent application Ser. No. 14/558,939, filed Dec. 3, 2014, now U.S. Pat. No. 9,130,989, which is a continuation of U.S. patent application Ser. No. 13/886,841, filed May 3, 2013, now U.S. Pat. No. 8,914,883, all of which are hereby incorporated by reference in their entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2013-2016, Fortinet, Inc.

BACKGROUND

Field

Embodiments of the present invention generally relate to the field of computer networks. In particular, various embodiments relate to methods and systems for securing email communications, particularly, outbound email communications.

Description of the Related Art

Communication and information sharing over the Internet is a growing trend and has become indispensible in current business and social interactions. Today, most companies have websites through which they offer information regarding the company and their products and/or services. Companies also use their websites and domains for other purposes including shareholder communications, sales of products/services, advertising and email communications. Since the advent of Internet, the popularity of electronic mail or "email" has grown to a point where it is now widely used for both personal and business communications.

As the Internet and email continue to be utilized by an ever increasing number of users, so does fraudulent and criminal activity via the Internet including increased usage of email for retrieval of confidential/meaningful information from genuine users. Phishing, spoofing, and malware are becoming more prevalent and are a growing concern that can take different forms. Cybersquatting and doppelganger domains are also increasingly becoming popular tools to trick users into believing that they are interacting with genuine companies or individuals associated with genuine companies. Cybersquatting is the act of registering a popular Internet address or a domain name, usually a company name, with intent of selling it to its rightful owner. According to the Anti-Cybersquatting Consumer Protection Act, cybersquatting relates to registering, trafficking in, or using a domain name with bad-faith intent to profit from the goodwill of a trademark belonging to someone else.

Commercial domain names, more particularly, second-level domain names of well-known companies, can be obtained from one of several registries. However, such registries do not attempt to determine whether the applicant is the rightful owner of the domain name. Consequently, a number of enterprising individuals and companies apply for and reserve domain names, either new or expired, that they think someone else will want, either now or in the future. Cyber squatters also reserve common English words, reasoning that sooner or later someone will want to use one for their websites including registering domain names that are mistyped spellings of popular web sites. Cyber squatters also regularly monitor recently expired domain names, hoping to sell back the domain name to a registrant who inadvertently allowed the domain name to expire.

Another growing concern is the use of doppelganger domains. A doppelganger domain, also commonly referred to as domain typo-squatting, is commonly used to spread malware to users who accidentally misspell a legitimate domain in their web browser. Doppelganger domains also include domain names spelled identical to a legitimate fully qualified domain name (FQDN) but missing the dot between host/sub-domain and domain, for example, to be used for malicious purposes. Doppelganger domains facilitate information gathering relating to trade secrets, usernames and passwords and other sensitive information.

Typically, two types of email-based attacks can be done by an attacker using a doppelganger domain—namely, a passive email attack and an active email attack. In a passive email attack, the attacker purchases the doppelganger domain and configures a mail server to receive all emails addressed to that domain regardless of the user/id it was sent to. For large organizations, a high-volume of emails are communicated everyday and a small percentage of such emails are typically sent to an incorrect destination as a result of a user error (a typo by the email's sender). For instance, instead of sending an email to xyz@microsoft.com, a user may accidently send an email to xyz@microsft.com. If the domain name microsft.com is registered and a corresponding mail service is configured appropriately, information associated with such misdirected email messages can be used by an attacker. Attackers typically exploit these types of user errors to collect emails from both internal and external users, thereby gaining access to potentially sensitive corporate or user information. Passive attacks generally rely on end users making a predetermined typographical error.

Active email attacks, on the other hand, are more common. An attacker creates a domain name that looks similar to a legitimate email domain of a well-known company and impersonates a person belonging to that particular organization in an attempt to obtain sensitive information from a target. These attacks are even more common with domain names that have sub-domain names prefixed or post-fixed. For instance, a company that has a domain name abc.com for its parent organization can have another domain name us.abc.com for its US office. In such cases, an attacker may create a domain name, such as usabc.com, and may initiate communications with users of the legitimate domain name in an attempt to obtain sensitive information.

Existing network and mail security solutions do not effectively prevent doppelganger domain name attacks and engage most efforts in manually monitoring and tracking such doppelganger domain names. In order to make Internet browsing and email communications more secure, there exists a need for systems and methods that can protect against doppelganger domain name attacks.

SUMMARY

Methods and systems are described for securing email communications, particularly, outbound email communications. Methods and systems are also provided for monitoring emails being sent by computing devices of an internal network and preventing such emails from being transmitted to fraudulent or incorrect domain names. According to one embodiment, a network device receives an outbound email originated by a computing device of an internal network and directed to a target recipient. It is determined whether a domain name of the target recipient is present in a global doppelganger database. When the domain name is determined to be present in the global doppelganger database, transmission of the outbound email to the target recipient is prevented if the domain name is an unacceptable domain name and transmission of the the outbound email to the target recipient is permitted if the domain name is an acceptable domain name.

Other features of embodiments of the present disclosure will be apparent from accompanying drawings and from detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

FIG. 4 illustrates an exemplary view of a local black list in accordance with an embodiment of the present invention.

FIG. 5 illustrates an exemplary view of a local white list in accordance with an embodiment of the present invention.

DETAILED DESCRIPTION

Figure 1:
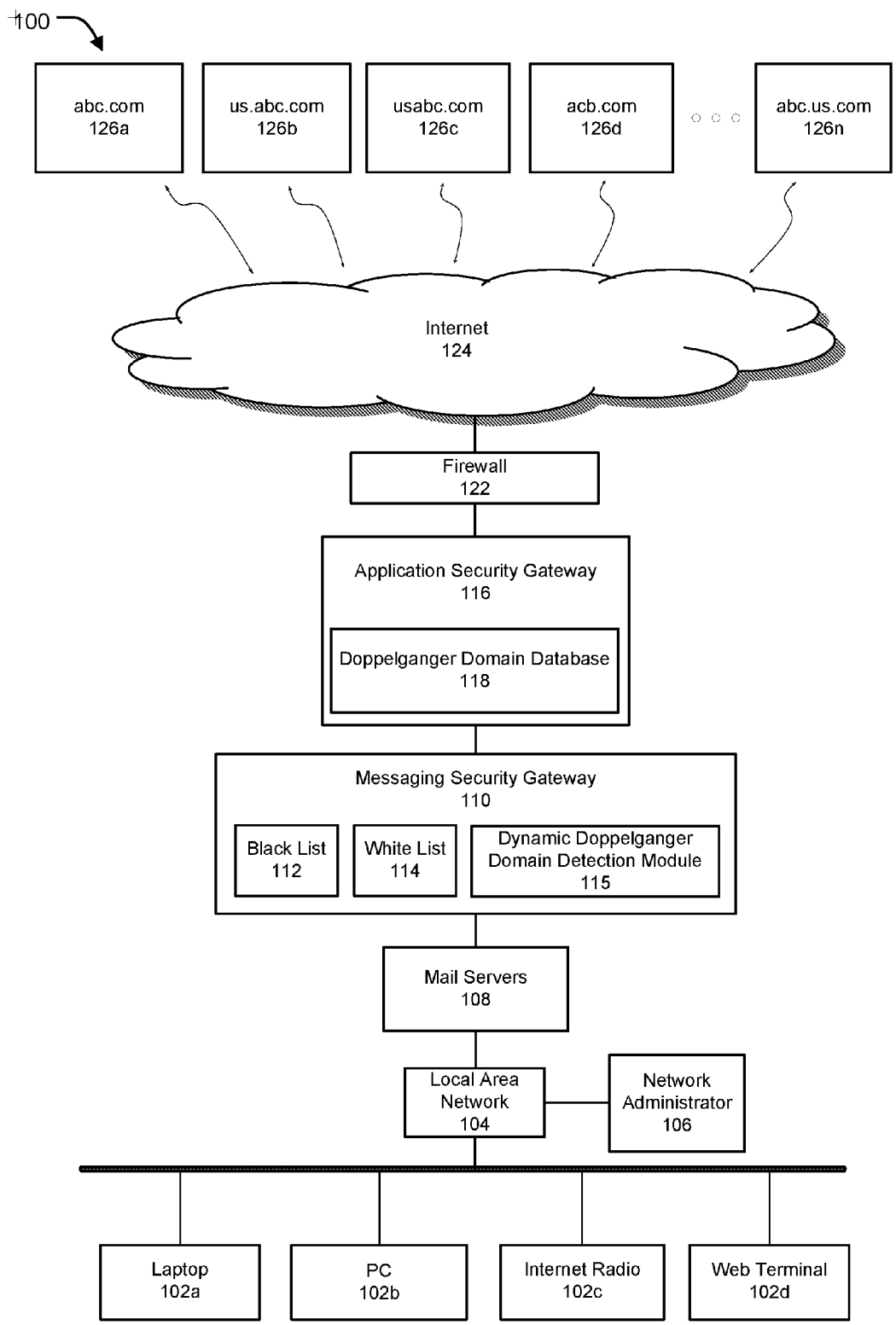
FIG. 1 illustrates an exemplary network architecture having an email security system in accordance with an embodiment of the present invention.

Methods and systems are described for securing email communications. Embodiments of the present invention generally relate to methods and systems for monitoring outbound email or the like sent by computing devices of an internal network and protecting such email communications from being transmitted to domain names found or suspected to be malicious or fraudulent. The systems and methods described herein allow assessment, monitoring and evaluation of outbound email from an internal network at a user defined level, wherein the proposed system can be implemented within any of a number of existing network devices, including, but not limited to mail servers, a local messaging security gateway, an application security gateway, a unified threat management device or at any other desired level, which can enable intercepting and evaluation of an outbound email communication with reference to local black/white lists and/or one or more global or local doppelganger databases. The systems and methods described herein also allow dynamic verification of domain names present within an email at run time to determine whether to send or block the email.

According to one embodiment, method of the present invention can be implemented in a messaging security gateway and provides for receiving, as input, an email from a computing device of an internal network to be delivered to a recipient. Internal network can include multiple computing devices such as PCs, Tablet PCs, mobile phones, and Laptops, among other such devices that are connected through a local area network (LAN) or other commonly used networking techniques to access external networks such as Internet, Intranet, or other networks through use of one or more network devices such as routers, switches, gateways, hubs, among other such devices. Each email can include a domain name, which helps indicate the mail server to which the email is to be delivered.

The proposed method further provides for evaluating whether domain name of the email to be delivered to the recipient is present in any of local white list or local black list, where the white list and the black list can be stored in any of the messaging security gateway, computing device, email server, or any another storage enabled device that can be accessed for such evaluation. Local white list can be configured to store a list of valid domain names, authenticity of which is verified to be correct. Local black list, on the other hand, can be configured to store a list of invalid domain names, authenticity of which is verified to be incorrect. The method further provides for transmitting the email if the domain name is present in local white list and stop transmission of the email if the domain name is present in local black list.

According to one embodiment, if domain name of email is not present in either local white list or local black list, the method further provides for checking whether the domain name is present in a global doppelganger database, wherein global doppelganger database can be stored in an application security gateway or any other suitable network device that can allow access of the database to the system (such as messaging security gateway) implementing the proposed method. The method further provides for transmitting the email if the domain name is present in global doppelganger database and marked as acceptable or stop transmission of the email if the domain name is present in database and marked as unacceptable.

According to one embodiment, if domain name of the email is not present in any of global doppelganger database, black list, and white list, method further provides for dynamically verifying validity of the domain name to transmit email if the domain name is verified as valid and stop transmission of email if the domain name is verified as invalid. According to another embodiment, for domain names marked as invalid or unacceptable, the method further provides for conducting one or more of blocking the email, forwarding the email to administrator, and bouncing the email back to sender of the email.

It will be appreciated by those skilled in the art that even though the present disclosure is explained with respect to monitoring and preventing email having doppelganger domain names to transmitted, the applicability of the methodologies described herein are also broadly applicable to monitoring and preventing use of doppelganger domain names, preventing communication in any form with doppelganger domain names, reception of incoming emails having doppelganger domain names, and delivery of emails having doppelganger domain names to users within an organization.

In the following description, numerous specific details are set forth in order to provide a thorough understanding of embodiments of the present invention. It will be apparent to one skilled in the art that embodiments of the present invention may be practiced without some of these specific details.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

If the specification states a component or feature "may", "can", "could", or "might" be included or have a characteristic, that particular component or feature is not required to be included or have the characteristic.

Although the present disclosure has been described with the purpose of securing email communication, it should be appreciated that the same has been done merely to illustrate the invention in an exemplary manner and any other purpose or function for which the explained structure or configuration can be used, is covered within the scope o the present disclosure.

Embodiments of present invention and their advantages are best understood with reference to FIG. 1. FIG. 1 is an exemplary network architecture conceptually illustrating a system 100 having network appliances for securing email communications or other functionalities in accordance with an embodiment of the present invention.

According to one embodiment, system 100 includes one or more computing devices such as laptop 102a, PC 102b, internet radio 102c, web terminal 102d, among other such devices 102 that may be configured to access one or more websites such as abc.com 126a, us.abc.com 126b, usabc.com 126c, abc.us.com 126n among other such websites 126 of different domain names connected through Internet 124 by means of an internal or external network or a combination thereof. As illustrated in FIG. 1, computing devices 102a-d can be coupled in communication with Internet 124 through a Local Area Network 104 (LAN), which is operatively coupled with and operated by a network administrator system 106. Network administrator system 106 can be configured to manage interactions of one or more computing devices 102a-d with one or more websites/domains 126 during exchange of emails or other transactions. It should be appreciated that the websites/domains 126 may or may not be configured with a mail server/exchanger (MX), and therefore can either be configured to receive and send emails or can simply provide a user interface with no mail server configured therefor.

According to one embodiment, computing devices 102a-d can be a part of an organization or enterprise having an internal network and therefore be configured to transmit and receive emails to and from one or more mail servers of websites/domains 126, which are operatively connected to Internet 124 through one or more network resources. In an exemplary embodiment, computing devices 102a-d are connected via wired or wireless connections to a local area network (LAN) 104 to access Internet 124 through a common interface. LAN 104 can be connected to devices such as mail servers 108, a messaging security gateway 110 and an application security gateway 116, among other such network devices, which, individually and/or collectively, help route or manage traffic flowing from LAN 104 to Internet 124. System 100 further includes a firewall 122 between application security gateway 116 and Internet 124, where firewall 122 acts as a network security or access control mechanism and is configured to shield data and resources from computer network intruders by creating an electronic boundary that prevents unauthorized users from accessing files or other content on a network or a computing device. In one embodiment, the messaging security gateway 110 comprises an email security appliance, such as one of the family of FortiMail email security appliances available from Fortinet, Inc. of Sunnyvale, Calif. In one embodiment, the application security gateway 116 comprises a network security appliance, such as one of the family of FortiGate network security appliances available from Fortinet, Inc. of Sunnyvale, Calif.

According to one embodiment, LAN 104 can be connected to mail servers 108 through one or more network devices, such as routers, switches, modems, load balancing devices, gateways, network appliances, wireless access points, threat management systems, hubs, firewalls, or other such devices, or any of computing device 102 incorporated with mail server 108, messaging gateway 110, application security gateway 116, firewall 122 can be directly connected to Internet 124. It will also be appreciated by those of ordinary skill in the art that system 100, as illustrated in FIG. 1, is merely an exemplary illustration and embodiments of the present invention may be used in alternative network architectures and configurations. For instance, one or more of computing devices 102a-d can be directly connected to mail servers 108. In some other embodiments, more or fewer network devices may be implemented within the enterprise network.

In the present example, a network administrator 106 can monitor, assess, and/or manage system 100. Network administrator 106 can check configurations of computing devices 102*a-d*, security settings, and modify security settings for users of computing devices 102*a-d*. Network administrator 106 can also monitor and provide reliable and good quality of network access to users.

According to one embodiment, a user accesses laptop 102*a* connected to LAN 104 to securely send an email that is associated with a particular domain name.

Once a composed email has been sent by the user, the email can be monitored by network administrator 106 and then transmitted to mail servers 108 via LAN 104. Mail servers 108 can be configured to act as mail transfer agents so as to receive the email and implement client and server portions of simple mail transfer protocol (SMTP) to handle inbound and/or outbound email communications. As SMTP is a common protocol used for client-server interactions it will not be described in detail herein. Email from mail servers 108 can be transmitted to messaging security gateway 110, wherein the gateway 110 can be configured with a dynamic doppelganger domain detection module 115 to check whether the domain name of the email received by the gateway 110 is present in black list 112 or white list 114, wherein the black list 112, also referred to as local black list 112 hereinafter, refers to a list of domain names that are invalid and rendered non-acceptable, and white list 114, also referred to as local white list 114 hereinafter, refers to a list of domain names that are valid and rendered acceptable. In an embodiment, instead of being present in messaging security gateway 110, local black list and local white list can also be implemented within any of computing devices 102*a-d* or in the mail server 108, or any other suitable system, locally or in the cloud. As mentioned above, black list 112 stores a list of invalid, wrong, mistyped, doppelganger and malicious domain names, to which emails are not to be transmitted and therefore blocked. White list 114, on the other hand, stores a list of valid and correct domain names, to which emails can be transmitted.

According to one embodiment, each of black list 112 or white list 114 can be updated based on observations of domain names present in email communications being transmitted by computing devices 102*a-d* and their validity. As will be described further below, domain names can also be dynamically verified in order to assess their validity, wherein if, after dynamic verification, the domain names are found to be valid, they can be added to white list 114; otherwise they can be added to black list 112. In an embodiment, apart from learning or dynamic assessment of the validity of domain names from email communications, valid or invalid domain names can also be pre-populated by a user or network administrator. While the email is being assessed at messaging security gateway 110, if the domain name of the email appears in black list 112, it is inferred that domain name is invalid and necessary actions are taken, whereas if the domain name appears in white list 114, it is inferred that the domain name is valid and the email is transmitted to intended recipient for completing desired communication.

According to one embodiment, if the domain name of an email is not present in black list 112 or white list 114, the email can be transmitted to application security gateway 116 for further validation. In the present example, application security gateway 116 can include an optional doppelganger domain database. The doppelganger domain database 120 is essentially a DNS blacklist and may represent a cached version or portion of a doppelganger domain database maintained in the cloud by a managed service provider. For example, access to a doppelganger domain database maintained in the cloud may be provided via a subscription-based service, such as FortiGuard subscription services available from Fortinet, Inc. of Sunnyvale, Calif. Application security gateway 116 can receive email from messaging security gateway 116 or directly from mail server 108 and can be configured to check whether a domain name referenced by an email communication at issue, for example, in the To, CC and/or BCC field of the email communication, is present in doppelganger database 118. Doppelganger database 118 can be created based on multiple parameters and attributes, such as known domain names, possible variants of known domain names, owners of possible variants, presence of valid website for possible variants, characteristics of owners of possible variants, presence of mail servers for the possible variants, presence of web servers for the possible variants, configuration settings of mail servers, time since registration of possible variants, among many other parmaeters. In an instance, for a valid and known name domain fortinet.com, possible variants can include domain names such as fortint.com, fortinet.co.in, uk.fortinet.com, fortunet.com, among many other such like variations. Doppelganger database 118 can be configured to compute and store, for each of said possible variations, owner of the variant domain name, information about past background of the owner, whether a mail server has been configured for the domain name or not, whether a websites exists for the domain name or not, among other such relevant information that can help make a decision regarding whether the domain name is valid and acceptable for email transmission.

According to one embodiment, email communications can be verified with reference to doppelganger database 118 in order to check the validity of a domain name of a recipient and/or an originator of the email communication and whether the domain name is valid and acceptable or if the same is invalid and hence non-acceptable. If a domain name is identified as valid, the email can be transmitted to the intended recipient; otherwise necessary actions including, but not limited to, blocking of the email, forwarding the email to network administrator 106, bouncing the email back to sender/user, and the like can be taken.

According to another embodiment, a domain name referenced in an email can also be checked against DNS blacklist 120 stored in application security gateway 116, wherein DNS blacklist 120 stores a list of malicious or blocked domains. In one embodiment, when a domain name is present in DNS blacklist 120, the email is not transmitted and desired remidial action is taken, else, in case the domain name is not present in DNS blacklist 120 or doppelganger domain database 118, the domain name is identified as a new domain name and dynamic verification for validity of the domain name may be carried out to identify whether the domain name is a doppelganger domain name or a valid domain name.

According to one embodiment, instead of being stored in application security gateway 116, doppelganger domain database 118 can also be stored in any other database such as a remote database/server, messaging security gateway 110, or any other location that can enable global level updation of valid/invalid domain names across multiple networks.

After verification and identification of the validity of the domain names referenced by an email communication at issue, firewall 122 takes care of secure communication of the email between application security gateway 116 and Internet 124. Firewall 122 acts as a network security or access control mechanism and is configured to shield data and resources from hacking, phishing or any other kind of attacks from computer network intruders and create an electronic boundary that prevents unauthorized users from accessing files or other content on a network or a computing device 102. Email can be transmitted to respective mail server of website 126 to complete the communication between computing device 102 and mail server. Various modules or structural features of messaging security gateway 110 and application security gateway 116 are described briefly in FIG. 2.

Figure 2:
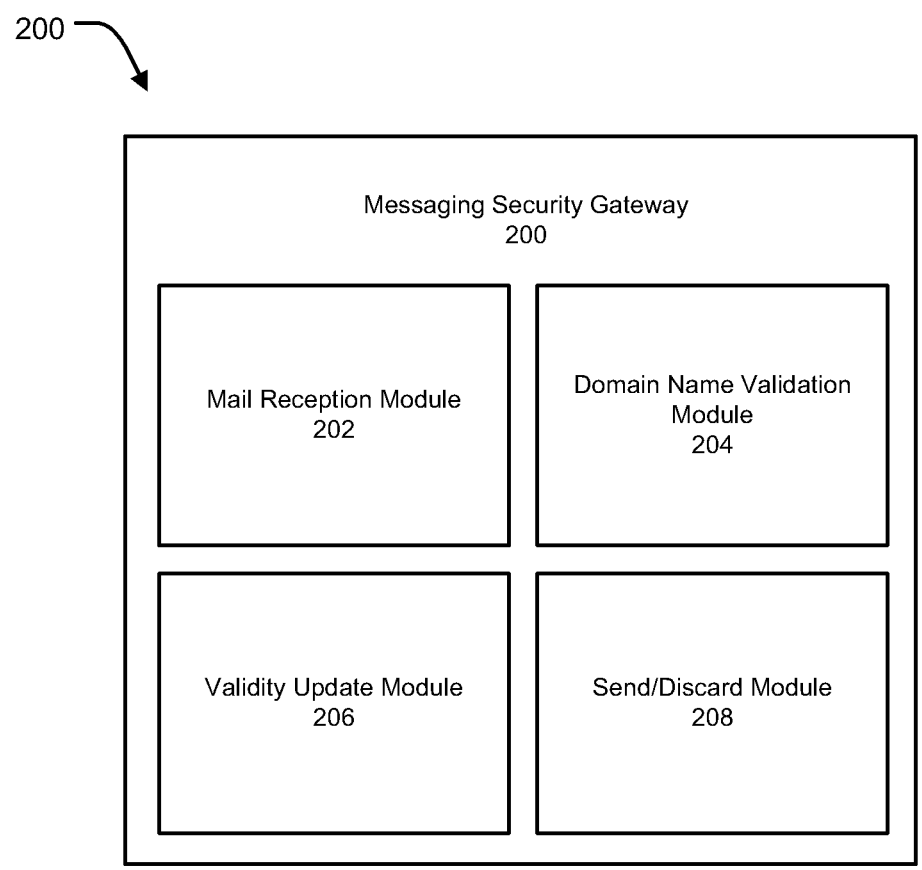
FIG. 2 illustrates exemplary modules of a messaging security gateway in accordance with an embodiment of the present invention.

FIG. 2 illustrates exemplary functional modules of system 200 in accordance with an embodiment of the present invention. System 200 can be interchangeably referred to as messaging security gateway 200 hereinafter, wherein gateway 200 can be configured to include, access, or be operatively coupled with a doppelganger domain database. In the present example, messaging security gateway 200 includes a mail reception module 202, a domain name validation module 204, a validity update module 206 and a send/discard module 208.

According to one embodiment, mail reception module 202 can be configured to receive an email from a computing device of an internal network that is to be transmitted to a mail server, wherein the email has a domain name associated thereto. In implemenation, a user accesses a computing device and composes an email to send it to a recipient using its respective email address. Mail reception module 202, which as mentioned above can be impemented in any of a messaging gateway, internal mail server, application gateway, or any other appropriate network equipment, can receive the email from the computing device of the sender and can implement client server portions of simple mail transfer protocol (SMTP) to handle emails and data in the form of graphics present in it. Upon processing of the email format and other evaluative attributes, mail reception module 202 sends the received email to domain name validation module 204.

Domain name validation module 204 can be configured to receive email from mail reception module 202 and evaluate domain name of the received email to verify validity of the domain name. According to one embodiment, domain name validation module 204 can be configured to access a local white list and a local black list, wherein the local white list can be created based on one or more of learning valid domain names from email communications or by pre-populating a list of domain names that are verified and held as being valid for email and other communcation. Local black list, on the other hand, can be created based on one or more of learning domain names as being invalid or by pre-populating a list of domain names that are verified as being invalid and unacceptable and to which email is not to be transmitted.

According to one embodiment, local white list and/or local black list can be stored at one or more of computing devices associated with an end user, any of internal email servers, messaging security gateway, or even at application security gateway, so as to enable local, fast, and efficient access to the lists in order to check validity of the domain name in context. Local white and black lists can also be stored such that the lists pertain to a specific organization/company and therefore the list can be modified at any time by network administrator or any other authorized person.

According to one embodiment, if the domain name being searched for is not present in any of local white list and local black list, domain name validation module 204 can be configured to check the domain name in a doppelganger database, which is also interchangebly referred to as global doppelganger database hereinafter, wherein the global doppelganger database can be created based on parameters such as known domain names, possible variants of known domain names, owners of possible variants, presence of website for possible variants, characteristics of owners of possible variants, presence of mail servers for possible variants, presence of web servers for possible variants, configuration settings of mail servers, time since registration of possible variants, among many other such parameters. For instance, for a given valid domain name, all possible variants (such as in spelling, pronunciation, and extension) can be identified and, for each of such variant, details relating to the owner of the variant domain name, time of registration of the variant domain name, details of whether a website is running for the variant domain name, details of whether a web server or mail server is configured for the variant domain name can be determined and entered into the doppelganger database. One or a combination of above mentioned parameters can then help arrive at a decision as to whether the domain name of the email received by system 200 is valid or invalid. For instance, in case the owner of fortinet.com is not the same as us.fortinet.com, there is high likelyhood that the domain name us.fortinet.com is not valid. Incorporation of multiple parameters can help understand and make a more accurate decision of whether the received domain name is valid and acceptable.

According to one embodiment, doppelganger database can be configured to store one or both of valid and invalid domain names, wherein a flag such as "acceptable" or "unacceptable" can be associated with each domain name in the doppelganger database, with the domain names flagged as "acceptable" being valid and domain names flagged as "unacceptable" being invalid. In another embodiment, doppelganger database can be divided into two separate tables or sub-databases, with one having only valid domain names and the other having only invalid domain names. In another embodiment, doppelganger database can be stored in any of mail server, messaging gateway, application gateway, or any other hardware/network equipement such that the doppelganger database is accessible to one or a combination of networks.

As mentioned above, domain name validation module 204 is configured to verify validity of domain name in doppelganger database by checking whether the domain name is present in the doppelganger database, wherein if domain name validation module 204 identifies that the domain name is present in doppelganger database and is marked as acceptable, email can be transmitted to intended recipient, wherein if domain name validation module 204 identifies that the domain name is present in the doppelganger database but is marked as unacceptable, the domain name is identified as invalid and the mail can be blocked and sent to send/discard module 208. If, on the other hand, domain name validation module 204 identifies that the domain name is not present in the doppelganger database, module 204 can be configured to identify the domain name as a new entry and dynamically verify validity of the domain name.

According to one embodiment, dynamic verification of validity of a domain name can be carried out using domain name information tools such as Dig or WHOIS that can check for parameters such as registration details of domain name, ownership details of domain name, presence of web site for domain name, characteristics of domain name, presence of mail server for domain name, presence of web server for domain name, configuration settings of mail server, configuration settings of web server, and time since registration of domain name, among other such paramerters to determine whether the domain name in context is valid or not. In an implementation, each domain name parameter can be assigned a particular weight, which can be dynamically assessed at run time by module 204 to compute values of the parameters from above mentioned exemplary tools, and then a final value of the domain name can be computed, based on which a decision of whether the domain name is valid or not can be taken. For instance, owner details of a domain name can have a higher weight than whether the domain name has a website corresponding thereto. It should be appreciated that a person ordinarily skilled in the art would be able to devise and identify many more parmaeters that can affect validity or authenticity of the domain name, on the basis of which module 204 can assess domain names.

According to one embodiment, upon dynamic verification of domain name, domain name validation module 204 can send verified domain name to validity update module 206. Validity update module 206 can receive verified domain name from the domain name validation module 204 and update doppelganger database and/or local white/black list based on result of verification. For instance, if the verified domain name is found to be valid, the domain name can be added in local white list and alternatively also in doppelganger database. Similarly, if the verified domain name is found to be invalid, the domain name can be added in local black list and alternatively also in doppelganger database. Based on validity of domain name corresponding to email received from mail reception module 202, the email can be transmitted to send/discard module 208 for taking suitable action on the email based on updated validity of the domain name.

According to one embodiment, send/discard module 208 can receive email from domain name validation module 204 and receive validity update status from the validity update module 206, wherein if the received validity status of the domain name is identified as valid, email can be transmitted to target recipient in order to complete the desired communication. On the other hand, if the received validity status of the domain name is identified as invalid, actions such as, but not limited to, blocking of the email, forwarding the email to network administrator of internal network, and bouncing back the email to sender, and the other like measures can be carried out. In another embodiment, if the user still wishes to send the email to the recipient after bouncing back upon identifying it as an invalid domain name, validity update module 206 can mark the domain name as valid and update the domain name in local white list and erase the same from local black list.

In an illustrative embodiment, a sender by means of a laptop, for example, can compose an email and send the same to one or more recipients using their respective email addresses having, for instance, a domain name usbc.com. Email can be received by mail server, which after checking the same transmits the email to messaging security gateway. Messaging security gateway can receive the email and check whether the domain name usbc.com in present in any of local black list or local white list, wherein if the domain name is present in white list, the same is sent to the intended recipient and if the domain name is present in black list, the email is blocked and not sent to the recipeint. Upon understanding that the domain name usbc.com is not present in any of the local black list or local white list, messaging gateway can be configured to transmit the domain name usbc.com to application security gateway in order to verify validity of domain name in doppelganger database, wherein the doppelganger database is created based on parameters such as known domain names, possible variants of the known domain names, owners of possible variants, existence of website for the possible variants, characteristics of the owners of the possible variants, presence of mail servers for the possible variants, presence of web servers for the possible variants, configuration settings of the mail servers, and time since registration of the possible variants, among many other such parameters.

In the case that domain name usbc.com is present in doppelganger database, status of whether the domain name is acceptable/valid or unacceptable/invalid is checked, wherein if the domain name is marked as acceptable/valid, the email is forwarded to intended recipient whereas if if the domain name is marked as unacceptable/invalid, the email is blocked from transmission. In case it is identified that the domain name usbc.com is not present in doppelganger database, the domain name is detected as a new entry and a dynamic assessment of the domain name usbc.com can be done to compute validity of the domain name and accordingly send/block decisoin is taken. Domain name information tools such as WHOIS can be used to capture attributes of domain name in context and accodingly verify validity of the domain name usbc.com, wherein such tools provide information including, but not limited to, domain owner, IP address of the domain name, location of the mail server, whether mail server is configured or not, registration time of the domain name, and the like, which can then be evaluated to verify whether the domain name is valid or not. Upon dynamic assessment of the domain name at run time, if it is identified that domain name usbc.com is invalid and mail cannot be transmitted to the respective recipient, the domain name can be added in doppelganger database and marked as unacceptable. System 200 can configure the email to be either bounced back to the sender or to be sent to network adminstrator, wherein the network adminstrator can also enter the invalid domain name in doppelganger database and/or local black list. In an implementation, if the sender still wishes to transmit the email to the invalid domain name by re-clicking on send button, the email can be transmitted to the recipient of invalid domain name and the domain name usbc.com can be updated in order to be entered into local white list.

Figure 3:
FIG. 3 illustrates an exemplary view of a doppelganger database in accordance with an embodiment of the present invention.

FIG. 3 illustrates an exemplary view of a doppelganger database 300 in accordance with an embodiment of the present invention. Doppelganger database 300 can include a table comprising various entries of domain names stored along with information relating to each domain name. In the present example, doppelganger database 300 further flags each domain name as either being "Acceptable" or being "Unacceptable", as is shown in the last column of doppelganger database 300. As shown in FIG. 3, doppelganger database 300 can include details such as, but not limited to, (i) whether MX (mail exchanger) is configured, but no web server is configured for the domain (e.g., there is no corresponding web site for the domain or it leads to a default domain parking URL), (ii) domain name owner details, (iii) time since registration, (iv) sliding scale score, among any other parameter of interest. For instance, characteristics of domain name owner can also be stored in database 300 including information such as other domain names that the same owner owns, prior background of the owner, location and correspondence email of the owner, and the like. In another embodiment, doppelganger database 300 can also store details related to parameters such as, presence of web server for the domain name, configuration settings of the web server, IP address of the domain name, location of the domain name, and the like.

According to one embodiment, during verification of a given domain name, messaging security gateway or any other appropriate system module can be configured to access doppelganger database 300 and check entries therein. During checking, if domain name validation module finds out that the domain name is present in database 300, it would check details and status of the domain name. On the other hand, if domain name is not present in database 300, domain name validation module will dynamically verify validity of the domain name and add the domain name into the database 300 along with the validity status. In an implementation, domain name validation module checks status of a domain name and, based on the status, sends information to send/discard module indicating whether to send email to the recipient or to discard the email. For instance, domain name validation module can verify validity of domain name us.abc.com. Domain name validation module can access database 300 and can obtain information related to us.abc.com indicating that MX (mail server) is configured, domain owner of the domain name is ABC, time since registration as 6 years, sliding scale score as 9.5 and status as acceptable. Upon identifying that the status acceptable, domain name validation module can inform the send/discard module to send email to the recipient.

In another example, domain name validation module receives domain name as "usaabc.net" for validation. Domain name validation module can access database 300 and obtain information relating to domain name usaabc.net, such as whether the MX (mail exchanger) is configured, but no web server is configured for the domain (e.g., there is no corresponding web site for the domain or it leads to a default domain parking URL), domain owner is XYZ, time since registration 9 months, sliding scale score 2.8, and status as Unacceptable. Upon identifying that the status is unacceptable, the domain name validation module can inform send/discard module to take appropriate action such as block email, bounce back email to the sender, inform network administrator, and the like. In an embodiment, database 300 can include a list of domain names stored along with other related details and status for all acceptable and unacceptable domain names. In another embodiment, doppelganger database 300 can include two tables, one each for acceptable and unacceptable domain names. In yet another embodiment, doppelganger database 300 can include a table comprising only of unacceptable domain names so that upon checking and identifying that a domain name is present in database 300, it is considered as invalid and unacceptable and is therefore automatically discarded.

FIG. 4 illustrates an exemplary view of a local black list 400 in accordance with an embodiment of the present invention. In the present example, local black list 400 stores a list of invalid and unacceptable domain names to which email is not to be sent. Local black list 400 comprises of columns storing various parameter details of domain names such as, but not limited to, domain name, MX (mail server) configuration details, domain owner, time since registration, web server configuration details, wildcard acceptance details, and the like. During verification, if a domain name is present in local black list 400, email corresponding to the domain name is not sent to the intended recipient. For instance, for domain name fortinett.com, local black list 400 includes the domain name and has information confirming MX (mail server) being configured, domain owner name being XYZ2, time since registration being 3 months, web server not being configured, and wildcard characters being acceptable.

FIG. 5 illustrates an exemplary view of a local white list 500 in accordance with an embodiment of the present invention. In the present example, local white list 500 stores a list of valid and acceptable domain names to which email is to be sent. Local white list 500 comprises of columns storing various parameter details of domain names such as, but not limited to, domain name, MX (mail server) configuration details, domain owner, time since registration, web server configuration details, wildcard acceptance details and the like. During verification, if a domain name is present in the local white list 500, email corresponding to the domain name can be sent to the particular recipient. For instance, for domain name fortinet.com, local white list 500 comprises details indicating MX (mail server) being configured, domain owner name being Fortinet, Inc, time since registration being 7 years, web server being configured, and wildcard character being acceptable.

Figure 6A:
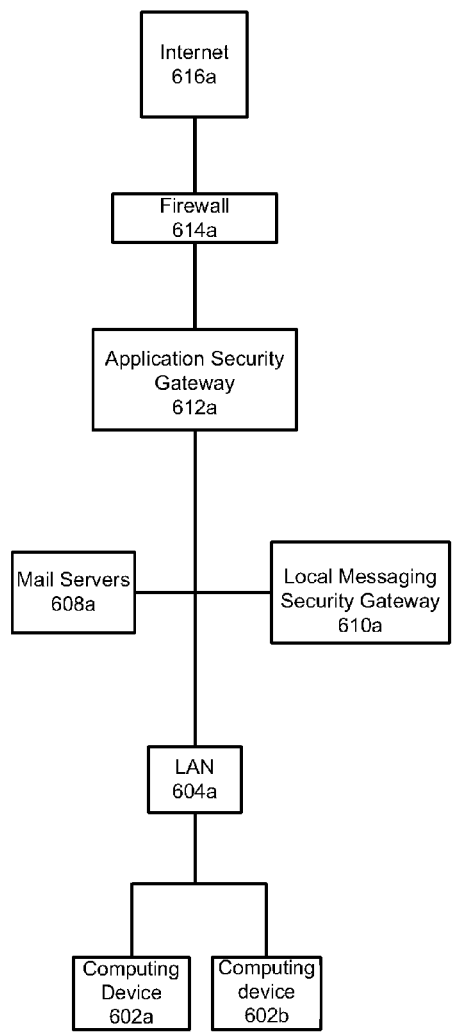
FIGS. 6A-B illustrate exemplary network architectures in accordance with embodiments of the present invention.
Figure 6B:
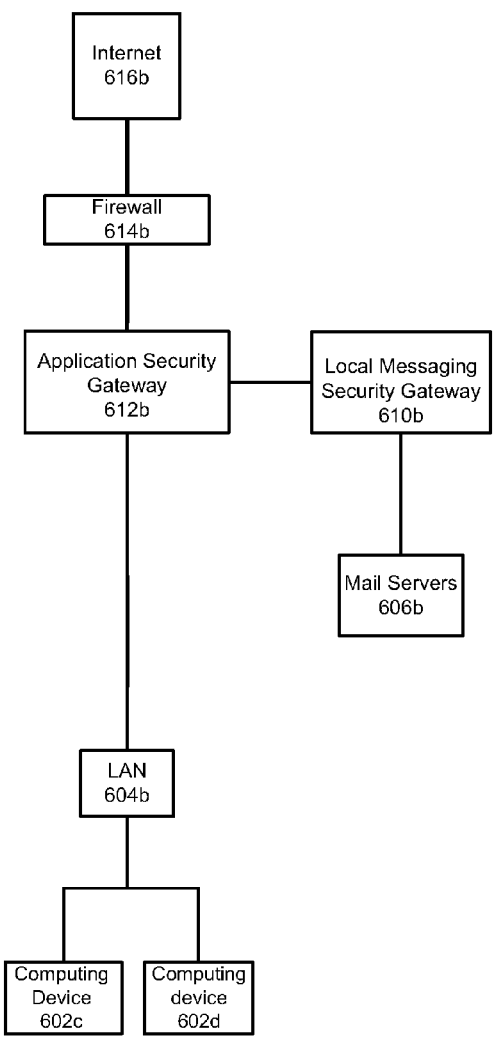

FIGS. 6A-B illustrate exemplary network architectures in accordance with embodiments of the present invention. Possible changes in network configurations include the presence/absence and/or physical/logical location of a local messaging security gateway, mail servers and an application security gateway. FIG. 6A illustrates a network architecture showing network configurations of LAN 604a, mail servers 608a, local messaging security gateway 610a, and application security gateway 612a. Computing devices 602a and 602b can be connected to LAN 604a within a particular location. In an embodiment, LAN 604a can be wired LAN or wireless LAN. Further, LAN 604a, mail server 608a, and local messaging security gateway 610a can be operatively connected to application security gateway 612a. Further, application security gateway 612a can be connected to firewall 614a, which in turn is connected to internet 616a. An outbound email sent by a sender from any of computing devices 602a and 602b can be sent via LAN 604a, wherein the outbound email can be verified at different modules as disclosed in earlier embodiments. Outbound email can initially be sent to mail servers 608a and then to local messaging security gateway 610a for verification of whether domain name of email in context is present in local white list or local black list and then, based on the verification, transmit the email to application security gateway 612a. Gateway 612a, using doppelganger database, further verifies (if domain name is not present in any of local black list or local white list) whether the domain name is acceptable or unacceptable (based on whether domain name is present in the doppelganger database or not). If the domain name of the outbound email is acceptable, the email can be sent to firewall 614a and then to the internet 616a for further transmission to destination mail server.

FIG. 6B illustrates a network architecture showing network configurations of LAN 604b, mail servers 608b, local messaging security gateway 610b, and application security gateway 612b. Computing devices 602c and 602d can be connected to LAN 604b within a particular location and LAN 604b can be wired LAN or wireless LAN. Further, LAN 604b can be connected to application security gateway 612b, wherein the gateway 612b can be connected to local messaging security gateway 610b. Local messaging security gateway 610b, can, in turn, be connected to mail servers 606b. Application security gateway 612b can be operatively connected to firewall 614b, which is connected to internet 616b for interacting with different mail servers. In another embodiment, application security gateway 612b can be connected to mail servers 606*b* and mail servers can be connected to local messaging security gateway 610*b* for verifying validity of domain names of outbound emails. Various other network configurations can be made to arrange local area network, local messaging security gateway and application security gateway, and person ordinarily skilled in the art can modify network configurations to dynamically verify validity of domain names of outbound emails without departing from the scope of the invention.

Figure 7:
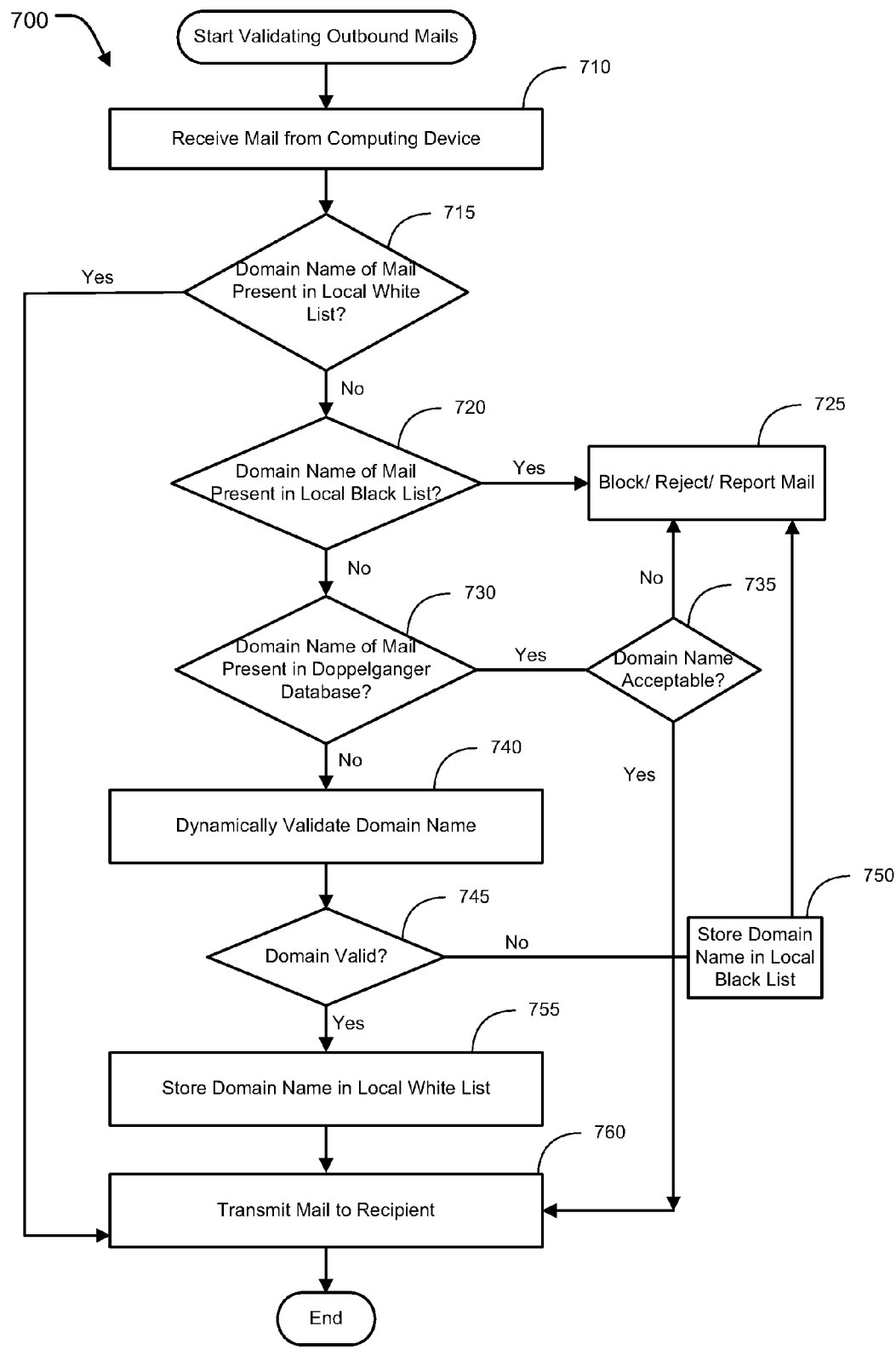
FIG. 7 is a flow diagram illustrating outbound email validation processing in accordance with an embodiment of the present invention.

FIG. 7 is a flow diagram 700 illustrating dynamic verification processing of domain names of outbound mails for secure email communication in accordance with an embodiment of the present invention. In the present embodiment, outbound email sent by a sender can be received and verified and determined as to whether the domain name of the received outbound email is doppelganger domain name or not, based on which a suitable action is then taken.

At block 710, an email can be received from a computing device. A sender composes email and sends to particular recipient using an email address having a particular domain name. Local messaging security gateway can be configured to receive the email sent from computing device via LAN and mail servers. In an embodiment, computing device can be any of, but not limited to, laptop, PC, internet radio, web terminal and the like and LAN can be wired LAN or wireless LAN.

At block 715, it is checked as to whether domain name of outbound email is present in local white list. Local messaging security gateway can be configurd to check whether the domain name of the outbound email is present in local white list, wherein the local white list stores a list of valid and acceptable domain names to which outbound emails can be transmitted. If the domain name is present in local white list, the method goes to execute block 760, else would move to block 720.

At block 720, it is checked as to whether the domain name is present in local black list. Local messaging security gateway can be configured to check whether the domain name is present in local black list, wherein the local black list stores a list of invalid and unacceptable domain names, which can be malicious and/or dangerous. If the domain name is present in local black list, the method moves on to block 725, else will move to block 730. At block 725, the email can be blocked and/or rejected and/or reporting to network administrator/sender.

At block 730, it is checked as to whether the domain name is present in doppelganger database, wherein doppelganger database is created based on parameters such as known domain names, possible variants of known domain names, owners of possible variants, presence of website for possible variants, characteristics of owners of possible variants, presence of mail servers for possible variants, presence of web servers for possible variants, configuration settings of mail servers, time since registration of possible variants, among other such information. Domain name of outbound email can be checked as to whether it is present in the doppelganger database, wherein if the domain name is present in doppelganger database, the method moves on to block 735, else the method moves on to block 740.

At block 735, it is checked as to whether the domain name present in the doppelganger database is acceptable. If the domain name is present in doppelganger database and is marked as acceptable, the method moves on to block 760, else the method moves on to block 725, wherein the mail is either blocked, rejected, or reported back to network administrator/sender.

At block 740, domain name of outbound email, which is not present in local white list, local black list, and doppelganger database, is dynamically validated. Various domain name information tools such as, but not limited to, Dig, WHOIS and the like can be incorporated and used to retrieve relevant information relating to the domain name and accordingly validate the domain name of the outbound email, based on multiple parameters as mentioned above in detail.

At block 745, it is checked as to whether the dynamically verified domain name is valid. Validity of the domain name indicates whether outbound mail can be transmitted to the recipient or not. If the domain name is held valid, the method moves on to block 755, else the method moves on to block 750.

At block 750, domain name can be stored in local black list. Upon identifying domain name as invalid, the domain name can be notified as invalid and unacceptable and can be stored in local black list so that in future if any outbound mail is being attempted to be sent to the same domain name, it can be blocked or rejected. Domain name stored in local black list can be sent to block 725 for subsequent blocking action. In an embodiment, at step 750, invalid domain name can also be entered and/or stored in doppelganger database.

At block 755, valid domain name is stored in local white list, wherein, upon identifying the domain name as valid after dynamic verification of domain name, the valid domain name can be stored in local white list for future reference so that if any email belonging to particular domain name is to be transmitted, such email can be transmitted without conducting another dynamic verification of validity of the particular domain name.

At block 760, mail is transmitted to the concerned recipient of the email. Email can be transmitted to mail server of the respective domain name through internet.

Figure 8:
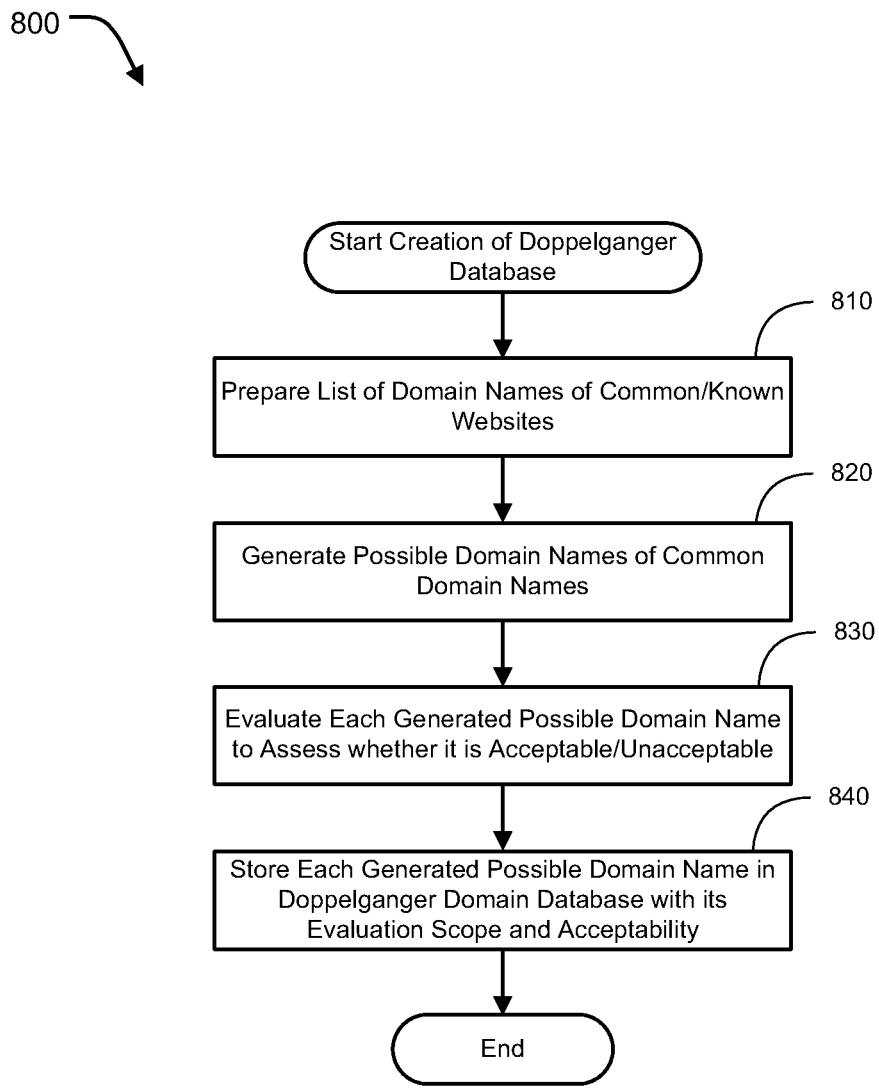
FIG. 8 is a flow diagram illustrating doppelganger database creation processing in accordance with an embodiment of the present invention.

FIG. 8 is a flow diagram 800 illustrating doppelganger database creation processing in accordance with an embodiment of the present invention. Steps of the following flow diagram 800 illustrate how doppelganger database can be created for domain names and can store information relating to the domain names including indication of whether the domain name is acceptable or unacceptable.

At block 810, a list of domain names of common/well known websites can be identified. In an embodiment, list of companies can include fortune 500 companies, top 100 companies from different domains and technology sectors, companies having turnover of over $1 billion, companies known to have valid domain names, among other such companies. Various other parameters can be considered to prepare such a list of common/known companies and domain names thereof to create doppelganger database, without departing from scope of the invention.

At block 820, a list of possible variants of known domain names computed in block 810 can be generated, wherein the variants can be generated based on combination of characters, repetition of certain characters, swapping of characters, change in extensions, addition/deletion of prefixes/suffixes, and all other possible techniques to generate close and similar domain names for a given valid domain name.

At block 830, each generated variant can be assessed in order to determine whether the domain name is acceptable or unacceptable. Domain name validation tools such as Dig or WHOIS can be used to evaluate each variant domain name, wherein the validation tools can provide information relating to registration of domain name, details of the owner of domain name, web server/mail server configuration of the domain name, among other such information. Based on such information, a given domain name can be evaluated and acceptance criteria can be detected so as to determine whether the domain name is acceptable or unacceptable.

At block 840, each generated domain name or a variant thereof can be stored in doppelganger database along with validity and acceptability status of the same. After each domain name is evaluated, information relating to the same can also be stored in doppelganger database.

Figure 9:
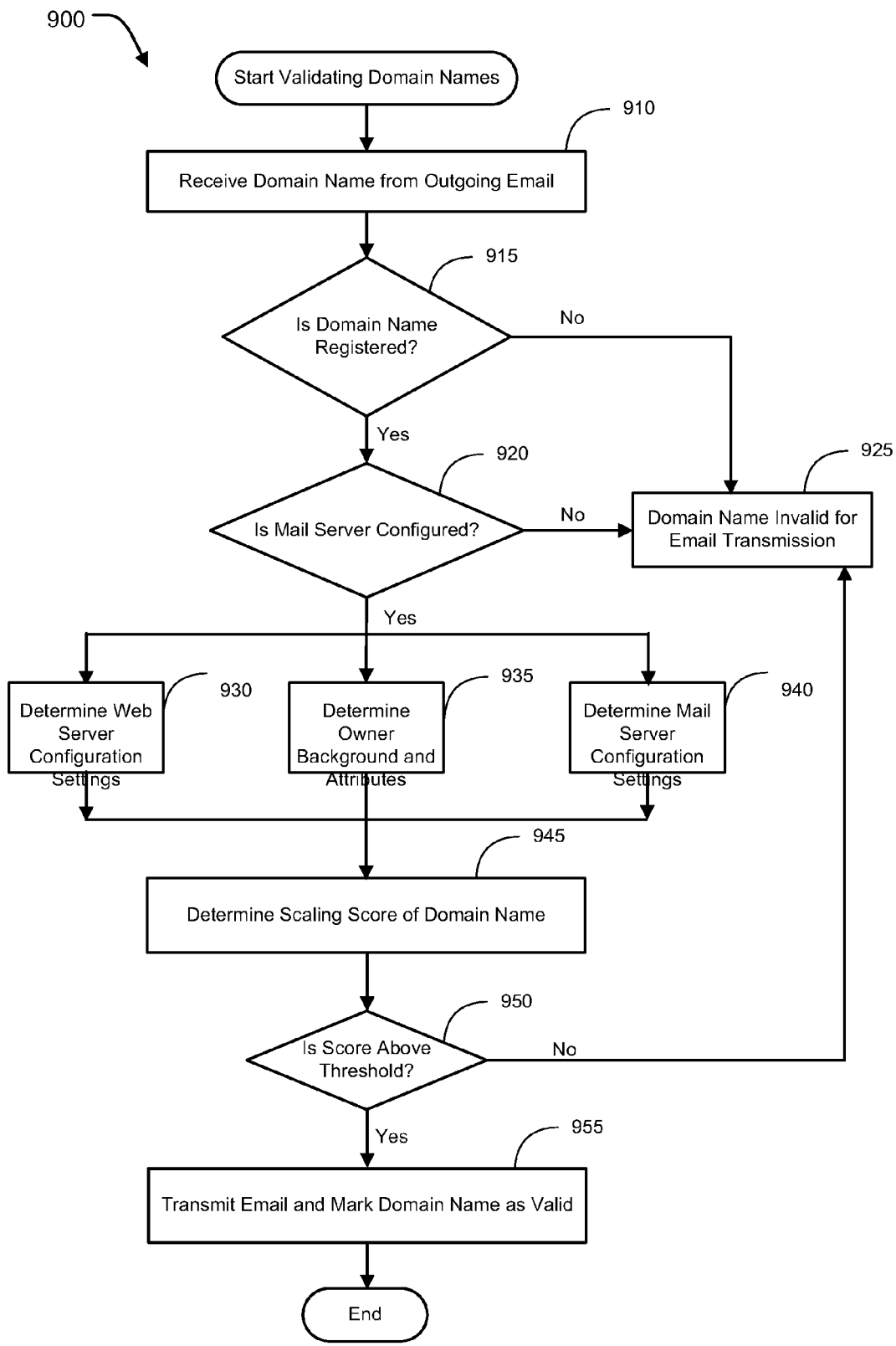
FIG. 9 is a flow diagram illustrating domain name validation processing in accordance with an embodiment of the present invention.

FIG. 9 is a flow diagram 900 illustrating dynamic validity processing of a domain name in accordance with an embodiment of the present invention. Flow diagram 900 illustrates dynamic validation of a domain name by evaluating the domain name in real time using parameters such as mail server configuration settings, web server configuration settings, background of the domain owner and characteristics thereof, domain name registration details, among other such information. In various other embodiments, any number of different set of parameters can be considered to validate domain names without departing from the scope of the invention.

At block 910, domain name of an outbound email can be received. Every email transacted on internet comprises of a user name followed by and ampersand or "@" sign, and domain name. Upon receiving the email, domain name of the email can be extracted dynamically from the email address. In an embodiment, domain name can be obtained by scanning of email address and separating second part of the email address after "@" sign. In another embodiment, email address can be read and ASCII value of each character can be calculated to obtain domain name. In another embodiment, any other known method for obtaining and receiving domain name can be used without departing from the scope of the invention.

At block 915, it is checked as to whether the received domain name is registered. Registration of domain name provides information regarding whether the domain name is live or has expired along with receiving other information relating to the domain name. If the domain name is not registered, it can be held as a malicious domain name and therefore rendered invalid/unsafe for email transmission. Upon checking registration details of domain name, if the domain name is identified as registered, the method goes to block 920, and if the domain name is not registered, the method moves on to block 925. At block 925, the email address is held as invalid and blocked for any email transmission.

At block 920, it is checked as to whether a mail server exists for the domain name and if the same is configured. Mail server acts as a mail transfer agent that can receive emails and implement client server portions of simple mail transfer protocol (SMTP) in order to handle emails and graphical data present in the mail content. If mail server of the domain name is configured, method 900 moves on for further validation of the domain name, else the method 900 moves on to block 925, where the email is rendered as invalid and hence blocked for transmission.

Further, at blocks 930, 935 and 940, web server configuration settings, owner background and attributes, and mail server configuration settings can be determined respectively. Web server configuration settings can be used to install and configure plug-ins associated with web server. Domain name owner background and attributes can include owner name, address, email address for communication, number of domain names in the name of owner, legal actions pending against the owner, among any other information that can help determine genuinity of the owner of the present domain name. Values of web server configuration settings, domain owner background and attributes, and mail server configuration settings can be combined and can be transmitted to block 945. In an implementation, any other parameters apart from the ones mentioned above can also be incorporated such as time since registration, whether a valid website existings for the domain name, among other such parameters to compute values related thereto.

At block 945, a scaling score can be computed for obtained values of web server configuration settings, domain owner background and attributes, and mail server configuration settings. Scaling score can be based on simple summation or a weighted summation of the values obtained from the above mentioned parameters, wherein the scaling score for each domain name can indicate authenticity of the domain name and whether the domain name is valid and has acceptable domain name configuration settings. In an embodiment, scaling score can be obtained on a scale of 0-100, or on a scale of 1-10, or even as a percentage.

At block 950, it is checked as to whether scaling score of a given domain name is above a predefined threshold. In an implementation, threshold can either be computed as a one-time standard threshold score or can be user defined for each type of domain name. Threshold value can also vary based on the domain name parameter values. In case the scaling score is above the threhsold value, at block 955, the domain can be marked as acceptable and valid, and the corresponding email can be transmitted to the receiver, whereas in case the scaling score is below the threhsold value, at block 925, the domain name can be marked as unacceptable and invalid and the corresponding email can be blocked/rejected.

At block 955, the domain name can be identified as valid for email transmission and suitable for secure email communication. Upon identifying domain name as valid, domain name can be updated in doppelganger database along with its attributes, scaling score and acceptance status, and email can be transmitted to the recipient securely. The present flow chart 900 can illustrates dynamic validation of domain name. Various other dynamic domain name validation method based on one or more domain name attributes can be used to detect validity of domain name dynamically without moving away from scope of the invention.

Figure 10:
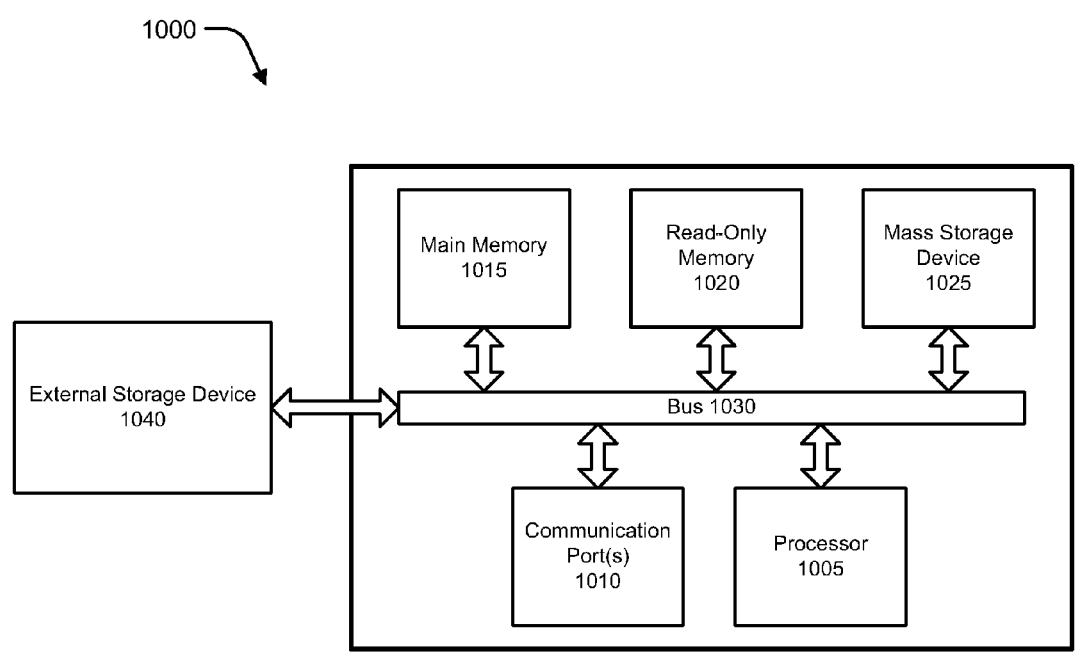
FIG. 10 is an exemplary computer system in which or with which embodiments of the present invention may be utilized.

FIG. 10 is an example of a computer system 1000 with which embodiments of the present disclosure may be utilized. Computer system 1000 may represent or form a part of a network device (e.g., firewall 122, application security gateway 116, messaging security gateway 110, mail servers 108) or other network security device, a server or a client workstation.

Embodiments of the present disclosure include various steps, which have been described above. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

As shown, computer system 1000 includes a bus 1030, a processor 1005, communication port 1010, a main memory 1015, a removable storage media 1040, a read only memory 1020 and a mass storage 1025. A person skilled in the art will appreciate that computer system 1000 may include more than one processor and communication ports.

Examples of processor 1005 include, but are not limited to, an Intel® Xeon® or Itanium® processor(s), or AMD® Opteron® or Athlon MP® processor(s), Motorola® lines of processors, FortiSOC™ system on a chip processors or other future processors. Processor 1005 may include various modules associated with messaging security gateway 200 as described with reference to FIG. 2. For example, processor 1005 may include one or more of mail reception module 202, domain name validation module 204, validity update module 206 and send/discard module 208.

Communication port 1010 can be any of an RS-232 port for use with a modem based dialup connection, a 10/100 Ethernet port, a Gigabit or 10 Gigabit port using copper or fiber, a serial port, a parallel port, or other existing or future ports.

Communication port 1010 may be chosen depending on a network, such a Local Area Network (LAN), Wide Area Network (WAN), or any network to which computer system 1000 connects.

Memory 1015 can be Random Access Memory (RAM), or any other dynamic storage device commonly known in the art. Read only memory 1020 can be any static storage device(s) such as, but not limited to, a Programmable Read Only Memory (PROM) chips for storing static information such as start-up or BIOS instructions for processor 1005.

Mass storage 1025 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), such as those available from Seagate (e.g., the Seagate Barracuda 7200 family) or Hitachi (e.g., the Hitachi Deskstar 7K1000), one or more optical discs, Redundant Array of Independent Disks (RAID) storage, such as an array of disks (e.g., SATA arrays), available from various vendors including Dot Hill Systems Corp., LaCie, Nexsan Technologies, Inc. and Enhance Technology, Inc.

Bus 1030 communicatively couples processor(s) 1005 with the other memory, storage and communication blocks. Bus 1030 can be, such as a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 1005 to system memory.

Optionally, operator and administrative interfaces, such as a display, keyboard, and a cursor control device, may also be coupled to bus 1030 to support direct operator interaction with computer system 1000. Other operator and administrative interfaces can be provided through network connections connected through communication port 1010.

Removable storage media 1040 can be any kind of external hard-drives, floppy drives, IOMEGA® Zip Drives, Compact Disc—Read Only Memory (CD-ROM), Compact Disc—Re-Writable (CD-RW), Digital Video Disk—Read Only Memory (DVD-ROM).

Components described above are meant only to exemplify various possibilities. In no way should the aforementioned exemplary computer system limit the scope of the present disclosure.

While embodiments of the present invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claim.

What is claimed is:

1. A method comprising:
   maintaining within a private network a database including information regarding each of a plurality of domains, including legitimate domains and doppelganger domains, wherein the the doppelganger domains represent potential malicious domains and include one or more of (i) a misspelliing of a fully qualified domain name (FQDN) of a well-known domain and (ii) an FQDN spelled identically to a legitimate FQDN but without a dot between a hostname portion and a domain name portion of the legitimate FQDN, wherein the information includes an indication regarding perceived legitimacy of the domain and one or more of an indication regarding configuration status of a mail server associated with the domain, an indication of a registered owner of the domain and an indication regarding how long the domain has been registered;
   receiving, by an email security appliance associated with the private network, an outbound email message originated by a host computing system of the private network and directed to a destination external to the private network;
   evaluating, by the email security appliance, a target domain specified within an address field of the outbound email message with reference to the database;
   when the indication regarding perceived legitimacy for the target domain identifies the target domain as acceptable to access, then allowing transmission of the outbound email message to the desination; and
   when the indication regarding perceived legitimacy for the target domain identifies the target domain as unacceptable to access, then preventing transmission of the outbound email message to the destination.

2. The method of claim 1, further comprising when the target domain is not present in the database, then adding a new entry to the database for the target domain by dynamically verifying validity of the target domain by retrieving information regarding one or more of a configuration status of a mail server associated with the target domain, a registered owner of the target domain and how long the target domain has been registered using a domain name information tool.

3. The method of claim 2, further comprising setting the indication regarding perceived legitimacy of the target domain based on the retrieved information.

4. The method of claim 3, further comprising when the validity of the target domain is affirmatively verified, then adding the target domains to a local white list.

5. The method of claim 3, further comprising when the validity of the target domain cannot be affirmatively verified, then adding the target domains to a local black list.

6. The method of claim 1, wherein the database is maintained within an applicaion sercuirty gateway of the private network.

7. A non-transitory computer-readable storage medium embodying a set of instructions, which when executed by one or more processors of an email security appliance associated with a private network, cause the one or more processors to perform a method comprising:
   receiving an outbound email message originated by a host computing system of the private network and directed to a destination external to the private network;
   evaluating, by the email security appliance, a target domain specified within an address field of the outbound email message with reference to a database accessible to the email security appliance that includes information regarding each of a plurality of domains, including legitimate domains and doppelganger domains, wherein the the doppelganger domains represent potential malicious domains and include one or more of (i) a misspelling of a fully qualified domain name (FQDN) of a well-known domain and (ii) an FQDN spelled identically to a legitimate FQDN but without a dot between a hostname portion and a domain name portion of the legitimate FQDN, wherein the information includes an indication regarding perceived legitimacy of the domain and one or more of an indication regarding configuration status of a mail server associated with the domain, an indication of a registered owner of the domain and an indication regarding how long the domain has been registered;

when the indication regarding perceived legitimacy for the target domain identifies the target domain as acceptable to access, then allowing transmission of the outbound email message to the desination; and when the indication regarding perceived legitimacy for the target domain identifies the target domain as unacceptable to access, then preventing transmission of the outbound email message to the destination.

8. The non-transitory computer-readable storage medium of claim 7, wherein the method further comprises when the target domain is not present in the database, then causing a new entry to be added to the database for the target domain by dynamically verifying validity of the target domain by retrieving information regarding one or more of a configuration status of a mail server associated with the target domain, a registered owner of the target domain and how long the target domain has been registered using a domain name information tool.

9. The non-transitory computer-readable storage medium of claim 8, wherein the method further comprises causing the indication regarding perceived legitimacy of the target domain to be set based on the retrieved information.

10. The non-transitory computer-readable storage medium of claim 7, wherien the method further comprises when the validity of the target domain is affirmatively verified, then adding the target domains to a local white list.

11. The non-transitory computer-readable storage medium of claim 7, wherien the method further comprises when the validity of the target domain cannot be affirmatively verified, then adding the target domains to a local black list.

12. The non-transitory computer-readable storage medium of claim 7, wherein the database is maintained within an applicaion sercuirty gateway of the private network.

* * * * *